United States Patent [19]

Pelger et al.

[11] Patent Number: 4,772,393
[45] Date of Patent: Sep. 20, 1988

[54] CELLULOSE DIALYSIS MEMBRANE WITH IMPROVED BIOCOMPATIBILITY

[75] Inventors: Michael Pelger; Helmut Schulze, both of Wuppertal, Fed. Rep. of Germany

[73] Assignee: Akzo NV, Arnhem, Netherlands

[21] Appl. No.: 81,534

[22] Filed: Aug. 4, 1987

Related U.S. Application Data

[63] Continuation of Ser. No. 713,888, Mar. 20, 1985, abandoned.

[30] Foreign Application Priority Data

Mar. 20, 1984 [DE] Fed. Rep. of Germany ....... 3410133
Oct. 20, 1984 [DE] Fed. Rep. of Germany ....... 3438531

[51] Int. Cl.⁴ ............................................. B01D 13/00
[52] U.S. Cl. ........................... 210/500.29; 210/500.24; 210/500.37
[58] Field of Search ....................... 210/500.24, 500.29, 210/500.37

[56] References Cited

U.S. PATENT DOCUMENTS

| | | | |
|---|---|---|---|
| 2,593,540 | 4/1952 | Cornwell et al. | 210/641 |
| 3,441,142 | 4/1969 | Oja | 210/500.24 |
| 4,051,040 | 9/1977 | Hazdra et al. | 210/500.24 |
| 4,145,515 | 3/1979 | Pogozelski et al. | 528/77 |
| 4,244,817 | 1/1981 | Yaginuma | 210/500.37 |
| 4,272,377 | 6/1981 | Gerlach et al. | 210/500.23 |
| 4,276,172 | 6/1981 | Henne et al. | 210/500.23 |
| 4,280,970 | 7/1981 | Kesting | 210/500.29 |

FOREIGN PATENT DOCUMENTS

| | | |
|---|---|---|
| 0026399 | 4/1981 | European Pat. Off. |
| 0046136 | 2/1982 | European Pat. Off. |
| 0111714 | 6/1984 | European Pat. Off. |
| 1720087 | 6/1971 | Fed. Rep. of Germany |
| 2642407 | 3/1977 | Fed. Rep. of Germany |
| 2705735 | 8/1978 | Fed. Rep. of Germany |
| 2358150 | 3/1982 | Fed. Rep. of Germany |
| 2478110 | 9/1981 | France |
| 57-095375 | 6/1982 | Japan |
| 57-162701 | 10/1982 | Japan |
| 57-162702 | 10/1982 | Japan |

OTHER PUBLICATIONS

D. E. Chenoweth et al., Kidney International, vol. 24, pp. 764–769 (1983), "Anaphylatoxin Formation During Hemodialysis . . .".
D. E. Chenoweth, Asaio Journal, vol. 7, pp. 44–49 (1984), "Biocompatibility of Hemodialysis Membranes".
The Condensed Chemical Dictionary, 10th Edition, G. G. Hawley, Von Nostrand Reinhold Co., N.Y., 1981, p. 522.

Primary Examiner—Peter Hruskoci
Attorney, Agent, or Firm—Parkhurst & Oliff

[57] ABSTRACT

The invention relates to a dialysis membrane of regenerated cellulose and to a process for its production. Isocyanate prepolymers with an average molecular weight of 300 to 50,000, which are soluble in organic solvents other than solvents reacting with isocyanate groups and dissolving cellulose, are bound chemically at least to one membrane surface of the dialysis membrane. The dialysis membrane of the present invention substantially eliminates the symptoms of leukopenia and complement activation.

9 Claims, 2 Drawing Sheets

Leukocyte count during hemodialysis

CELLULOSE DIALYSIS MEMBRANE WITH IMPROVED BIOCOMPATIBILITY

This is a Continuation of application Ser. No. 713,888 filed Mar. 20, 1985, now abandoned.

This invention relates to dialysis membranes for hemodialysis.

BACKGROUND OF THE INVENTION

Dialysis membranes of regenerated cellulose for hemodialysis in the form of flat films, tubular films, or hollow threads are known and are used in artificial kidneys, although some of their properties cause difficulties which have not yet been eliminated.

A dialysis membrane for hemodialysis with reduced thrombogenic activity, made of cellulose with chemically bound antithrombogenic compounds, is known from German Pat. No. 27 05 735. This dialysis membrane includes two or more layers of cellulose regenerated from cuoxam cellulose solutions, layers which were respectively obtained from separately supplied slits of a spinneret, whereby the cellulose layer on the blood side consists totally or partially of a modified cellulose which contains chemically bound antithrombogenic substances.

It has been previously proposed, however, in German Offenlegungsschrift No. 17 20 087 to reduce the danger of blood coagulation by reacting the polymer material of the membrane with an alkyl halide and then reacting the resulting material with an alkali salt of an antithrombogenic compound with cationic residues (e.g., heparin or a heparinoid compound). The possible alkyl halides include halogen alkyldialkylamines. Cellulose, primarily cellulose acetate, is included among possible polymers.

While dialysis membranes of synthetic or natural polymers when used in artificial kidneys can very easily cause blood coagulation, this is largely prevented by appropriate drug treatment or by the aforementioned special dialysis membranes. However, there is often a further problem with dialysis membranes of regenerated cellulose, which has not previously been solved satisfactorily. It has been demonstrated that a transient decline in leukocytes can occur at first in dialysis treatment of a kidney patient with cellulose membrane dialysers. This effect is known as leukopenia.

Leukopenia is a decline in the leukocyte (white blood cell) count in circulating blood. The number of white blood cells in humans is about 4,000 to 12,000 cells/mm$^3$.

Leukopenia in dialysis is most strongly evident 15–20 minutes after its start, when neutrophils (leukocytes stainable with neutral or concurrently with acidic and basic dyes) can almost totally disappear. Within about an hour, the leukocyte count recovers almost to the starting value or exceeds the starting value.

If a new dialyzer is connected after the recovery of leukocytes, leukopenia of the same extent recurs.

Cellulose membranes provoke a marked leukopenia. Even if the clinical significance of the leukopenia is not scientifically explained, there still is the desire for a dialysis membrane for hemodialysis which does not exhibit the leukopenia effect, and also does not impair the other very desirable properties of dialysis membranes of regenerated cellulose.

Marked complement activation, in addition to leukopenia, has also been demonstrated in hemodialysis with membranes of regenerated cellulose. The complement system within blood serum is a complex plasma enzyme system, including many components, which serves in different ways as a defense against invading foreign cells (bacteria, etc.). If antibodies against the invading organism are present, the complement system can be activated, via the antibody complex, by the antigenic structures found on foreign cells or, by an alternate route, by means of specific surface features of the foreign cell. The complement system is based on many plasma proteins. Following activation these proteins interact specifically in a certain sequence and in the end a cytolytic complex is formed that destroys the foreign cell.

Peptides, which induce inflammation symptons and occasionally may also have undesirable pathological consequences for the body, are released from separate components of the complement system.

It is assumed that the complement system activation by hemodialysis membranes made of regenerated cellulose occurs via the above-mentioned alternate route. Objectively this complement activation can be demonstrated by determination of fragments C3a and C5a among others. The following reports are cited in this regard: D. E. Chenoweth et al., Kidney International, Vol. 24, pp. 764 ff (1983), and D.E. Chenoweth, Asaio, Journal Vol. 7, pp. 44 ff (1984).

SUMMARY OF THE INVENTION

Although the clinical significance of complement activation still has not been explained, efforts are being made to eliminate it in hemodialysis if possible. For this reason, the objective of the present invention is to modify hemodialysis membranes of regenerated cellulose to such an extent that the indicated symptoms of leukopenia and complement activation no longer occur. This problem has been solved by dialysis membranes according to the present invention.

BRIEF DESCRIPTION OF THE DRAWINGS

The results produced in the instant Examples are graphically shown in FIGS. 1 and 2.

DETAILED DESCRIPTION OF THE INVENTION

Figure 1:
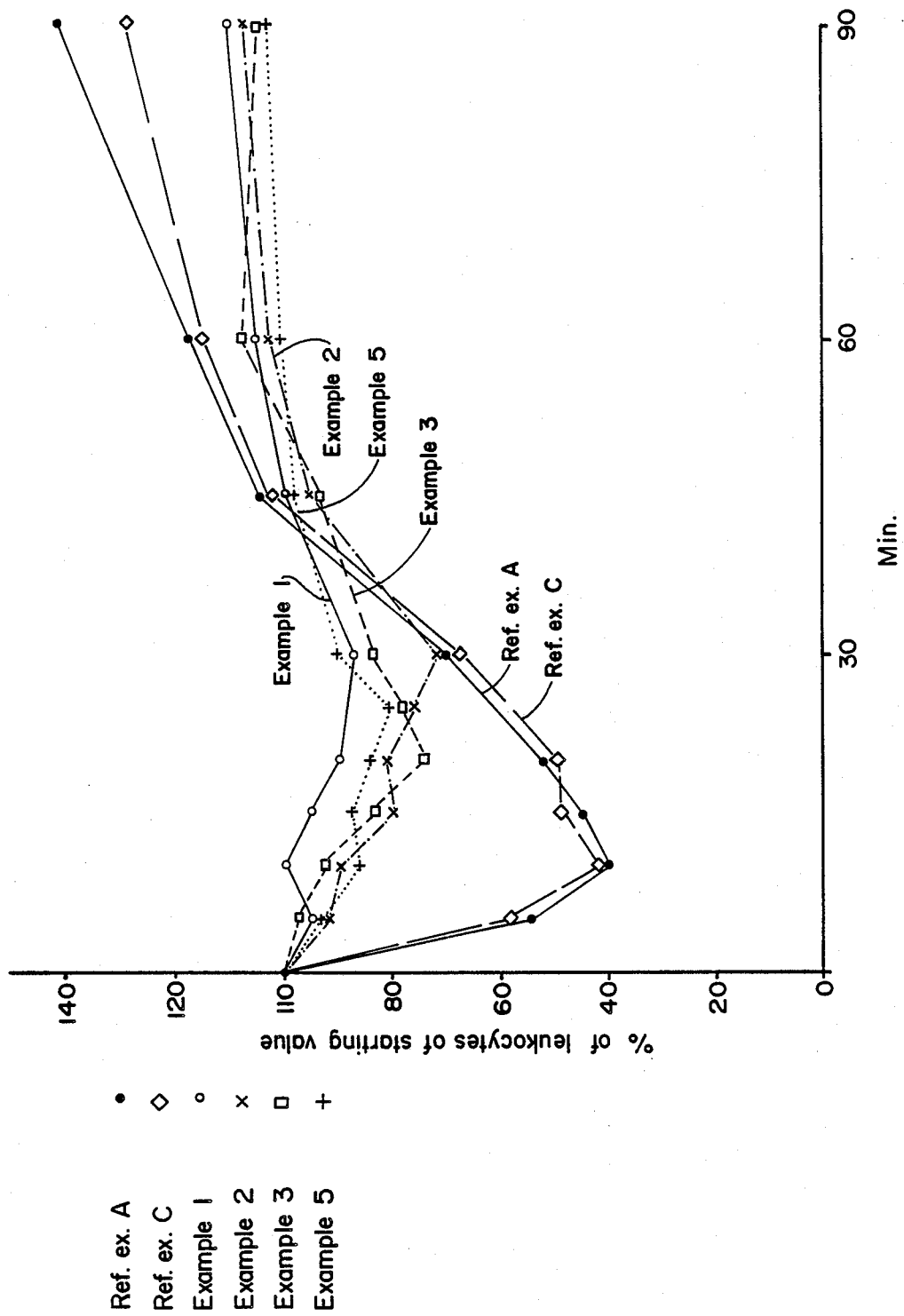

The dialysis membrane according to the invention in the form of flat films, tubular films or hollow threads of regenerated cellulose includes isocyanate prepolymers, having an average molecular weight of 300 to 50,000 and being soluble in organic solvents other than solvents which react with isocyanate groups and dissolve cellulose, bound chemically at least to one membrane surface.

Examples of solvents that do not react with isocyanate groups and do not dissolve cellulose include methylene chloride, chloroform, tetrahydrofuran, dioxan, dimethylformamide, dimethylacetamide and acetone. The solvents can be used alone or as a mixture in the preparation of the membranes according to the invention, provided that the mixture meets the requirement that it does not dissolve cellulose. The solvent preferably exhibits good solvency for the isocyanate prepolymers at temperatures below 60° C., especially at room temperature.

Isocyanate prepolymers are obtained by reacting H-acid compounds with isocyanate compounds containing several isocyanate groups, with the molar ratio of the H-acid compound to isocyanate lower than would be necessary for a reaction of all isocyanate groups, so that free N=C=O residues are available for the addition of the prepolymer to cellulose. Preferably, the isocyanate prepolymer is a reaction product of a hydroxy compound and a polyfunctional isocyanate compound.

Suitable hydroxy compounds include polyhydroxy compounds such as hydroxyl-group-containing polyethers such as polyethylene glycol, polypropylene glycol and polytetramethylene glycol; hydroxy-group-containing polyesters, such as polyethylene adipate, polypropylene adipate and polybutylene adipate; hydroxyl-group-containing polycarbonates such as, for example, polyhexanediol carbonate. Naturally occurring polyhydroxy compounds such as, for example, castor oil or castor oil derivatives or monoglycerides of naturally occurring fatty acids and mixtures thereof can be used in the reaction with di-, tri- and/or polyfunctional isocyanate compounds.

Examples of suitable isocyanate compounds include diphenylmethane diisocyanate, toluylene diisocyanate, hexamethylene diisocyanate, dicyclohexylmethane diisocyanate, isophorone diisocyanate, cyclohexyl diisocyanate and triphenylmethane triisocyanate.

In one embodiment of the invention, the isocyanate prepolymer is a reaction product of diisocyanate and an ethoxylated fatty alcohol with 6 to 30 C atoms.

In a further embodiment of the invention, the isocyanate prepolymer is a reaction product of a diisocyanate and an ethoxylated fatty acid with 6 to 30 C atoms. Preferably the degree of ethoxylation in this case is 5 to 400.

Especially preferred are isocyanate prepolymers which are reaction products of a diisocyanate and polyhydroxy compounds. Dihydroxy and trihydroxy compounds are used preferably as polyhydroxy compounds in synthesis of the isocyanate prepolymers.

In a further embodiment of the membranes of the invention, the isocyanate prepolymer is a reaction product of an initial reaction between a hydroxy compound and a polyfunctional isocyanate compound, and a subsequent reaction of this intermediate with hydrazine and/or an aliphatic diamine with a chain length of 2 to 30 C atoms.

The present invention reduces to a great extent the leukopenia and complement activation by dialysis membranes made of cellulose, regardless of the respective preparation. Because of the beneficial dialysis properties of cellulose regenerated from cuoxam solutions, this formulation is preferred. The average molecular weight of the regenerated cellulose should preferably be 80,000 to 150,000.

The invention also relates to a method for the production of the claimed dialysis membrane. In this method a dialysis membrane made from regenerated cellulose is treated for 3 minutes to 24 hours with a solution of an isocyanate prepolymer in an organic solvent which does not react with the selected prepolymer and does not dissolve cellulose, at a temperature exceeding about 10° C. and below the boiling point of the solvent, and excess prepolymer is then flushed out with pure solvent and the solvent is removed.

The treatment time is determined by the isocyanate prepolymer, the concentration in the reaction solution and the temperature. Isocyanate prepolymers derived from aromatic isocyanates normally react more rapidly in this case than those derived from aliphatic isocyanates, so that catalysts may be used to shorten treatment time, especially in the latter case. Iron-III-acetylacetonate proved itself an eminently suitable catalyst for the present invention. It is possible to limit the treatment time for membranes to a period of 5 minutes to 3 hours with the use of the catalyst even for slowly reacting isocyanates.

The concentration of the isocyanate prepolymer in solvent is preferably 0.1 to 20 volume %, more preferably 1.0 to 10.0 volume %.

Since the dialysis membranes are to be used for hemodialysis, it is especially important to remove the solvent. Preferably, the solvent is flushed out with a highly volatile organic solvent that does not dissolve cellulose, and the remaining residual solvent is evaporated out.

The invention is further illustrated by the following non-limiting examples.

REFERENCE EXAMPLE A

Hemodialysis was carried out in rabbits with a hemodialyzer containing hollow threads of cellulose regenerated from cuoxam solutions and a membrane surface of 500 cm$^2$. Samples were obtained from blood leaving the dialyzer at certain time intervals and the leukocyte count was determined in these samples. The obtained counts were related to the original leukocyte count for the rabbit and are presented in FIG. 1 in comparison with examples 1, 2, 3 and 5.

REFERENCE EXAMPLE B

Complement activation was studied directly in humans in an ex-vivo system with dialyzer cells which contained hollow threads corresponding to those of reference example A, but with a membrane surface of 50 cm$^2$. Fragments C3a and C5a were assayed by the RIA (radioimmunoassay) method (Upjohn test).

The results of the assay were:

C3a=15,300 ng/ml
C5a=124 ng/ml.

REFERENCE EXAMPLE C

Hemodialysis was carried out in rabbits in a procedure similar to that in reference example A with a hemodialyzer with a 500 cm$^2$ membrane surface, which however contained hollow threads of cellulose, type SCE, regenerated by saponification of cellulose acetate. The obtained values are graphically presented in FIG. 1.

EXAMPLE 1

Hollow threads of cellulose, regenerated from cuoxam solutions, were treated for 10 min with a 10 vol. % solution of an isocyanate prepolymer, which was produced from 100 g of castor oil and 71.4 g of 4,4'-diphenylmethane diisocyanate, in methylene chloride. The threads were then rewashed with pure methylene chloride and the residual solvent was drawn off. The subsequently dried hollow threads were used for the determination of UFR (ultrafiltration rate) and the dialysis permeability (DL) for creatinine. The obtained values are compared below for the membrane of this example and of an untreated membrane.

|  | threads treated according to example 1 | untreated hollow threads |
| --- | --- | --- |
| UFR$_{(ml/h \cdot mm\ Hg)}$ | 3.4 | 4.9 |

| | threads treated according to example 1 | untreated hollow threads |
|---|---|---|
| $DL_{creatinine\ (cm/min)}$ | $33 \times 10^{-3}$ | $45 \times 10^{-3}$ |

The results of an analysis of leukopenia in rabbits are shown in FIG. 1. The decline in the leukocyte count is much lower in comparison with untreated hollow threads. The tests were performed with a dialyzer with a membrane surface of 500 cm².

EXAMPLE 2

Analogous to example 1, hollow dialyzer threads of cellulose regenerated from cuoxam solutions were treated with a 5 vol. % solution of an isocyanate prepolymer in dimethylformamide with addition of 0.1 wt. % iron-III-acetylacetonate in relation to the prepolymer for 15 minutes at room temperature. The prepolymer was synthesized from 383 g of polyethylene glycol with an average molecular weight of 2000 and 100 g of 4,4'-dicyclohexylmethane diisocyanate. Residual solvent was then flushed out with dimethylformamide and then with methylene chloride. After the methylene chloride was drawn off, the threads were dried.

Both the UFR and dialysis permeability produced the same values as obtained with untreated hollow threads, namely:

UFR = 4.9 ml/m²·h·mm² Hg
$DL_{creat} = 45 \times 10^{-3}$ cm/min.

The result of the leukocyte counts as a function of dialysis time in rabbits, with a dialyzer with 500 cm² of membrane surface, is shown in FIG. 1.

EXAMPLE 3

Analogous to the previous examples, the same type of dialysis hollow threads were again treated in acetone for 3 hours with a 1 vol. % solution of the isocyanate prepolymer described in example 1. After the hollow threads were flushed out with acetone, the hollow threads were dried.

The same values for UFR and dialysis permeability for creatinine versus untreated hollow threads were obtained in this case as well. The result of the leukocyte count in the dialysis of rabbits with a dialyzer with a 500 cm² membrane surface is shown in FIG. 1.

EXAMPLE 4

A 10 vol. % solution in methylene chloride of an isocyanate prepolymer, synthesized from 100 g of castor oil and 74.6 g of 4,4'-dicyclohexylmethane diisocyanate with 0.1 wt. % in relation to the isocyanate prepolymer of iron-III-acetylacetonate, was used in the treatment of cellulose hollow threads regenerated from cuoxam solutions. Treatment time was 20 min.

In addition to the determination of the leukocyte count in the dialysis of rabbits with a dialyzer with a 500 cm² membrane surface and determination of UFR and dialysis permeability of creatinine, complement activation was elucidated by determination of fragment components C3a and C5a in blood samples, which were obtained as in reference example B in humans in an exvivo system with cells with a 50 cm² membrane surface. The value for C3a was only 3700 ng/ml and for C5a 11 ng/ml.

The dialysis effects remained unaltered in relation to untreated cellulose hollow threads.

EXAMPLE 5

The isocyanate prepolymer was a polymer synthesized from 120 g of polyethylene glycol with a molecular weight of 6000 and 10 g of 4,4'-diphenylmethane diisocyanate. It was used as a 15 vol. % solution in dimethylacetamide.

Treated were hollow threads of regenerated cellulose type SCE with a lumen diameter of 168 μm and a wall thickness of 17 μm. The cellulose was regenerated by saponification of cellulose acetate. After a treatment time of 45 minutes, the residual solvent was flushed out with dimethylacetamide and the threads were then rewashed with methylene chloride. The dried hollow threads were evaluated for their performance and the leukocyte count was determined in the dialysis of rabbits with a dialyzer having a 500 cm² membrane surface. The decline in leukocytes is shown in FIG. 1 in comparison with the other examples, the reference example A, and a comparison test with untreated hollow threads type SCE, used in this example (Reference example C).

The UFR was 2.0 ml/h·m²·mm Hg. For untreated hollow threads, the UFR was 2.9 ml/h·m²·mm Hg. The dialysis permeablity for creatinine was $30 \times 10^{-3}$ cm/min, versus $45 \times 10^{-3}$ cm/min for untreated hollow fibers.

EXAMPLE 6

The isocyanate prepolymer used in this example was a reaction product obtained in a two-stage reaction. In the first stage, 50.4 g of 4,4'-dicyclohexylmethane diisocyanate was reacted with 95.2 g of castor oil. In the second stage, the resulting intermediate was reacted with 5.8 g of hexamethylenediamine. This reaction product was then used as a 10% solution in dimethylacetamide.

Hollow threads of cellulose regenerated from cuoxam solutions were treated for 1 hour at 50° C. The hollow threads were then flushed with pure dimethylacetamide, the dimethylacetamide was removed with acetone, and the hollow fibers were dried. Analysis of leukopenia produced the response shown in FIG. 2.

EXAMPLE 7

An isocyanate prepolymer produced in stages was also used in this example. In the first stage, 50 g of 4,4'-diphenylmethane diisocyanate was reacted with 60 g of polyethylene glycol with an average molecular weight of 600. In the second stage, the intermediate was reacted with 1.6 g of hydrazine.

Hollow threads of cellulose regenerated from cuoxam solutions were treated with a 5% solution of the isocyanate prepolymer in dimethylacetamide. Treatment was carried out at room temperature and continued for a period of 10 minutes. The hollow threads were then washed with pure dimethylacetamide and then with acetone, and dried.

Figure 2:
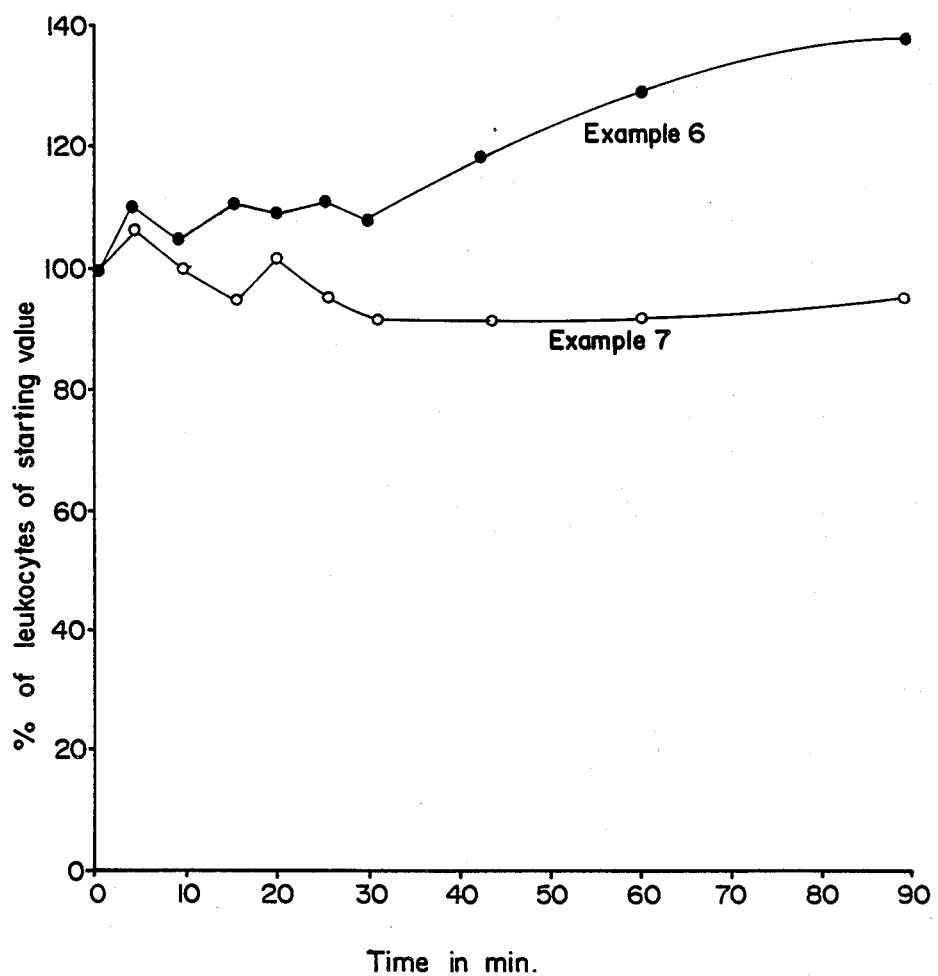

The response of leukopenia in rabbits is shown graphically in FIG. 2.

What is claimed is:

1. A hemodialysis membrane, comprising a membrane consisting essentially of regenerated cellulose having sufficient isocyanate prepolymer chemically bound to at least one surface of said membrane, to prevent luekopenia occurrence and complement system activation by said hemodialysis membrane, said isocyanate prepolymer having an average molecular weight of 300 to 50,000 and being soluble in organic solvents other than solvents which react with isocyanate groups and dissolve cellulose, wherein the isocyanate prepolymer is a reaction product of reaction between isocyanate groups of a polyfunctional isocyanate compound and hydroxyl groups of a hydroxy compound selected from the group consisting of an ethoxylated fatty alcohol with 6 to 30 carbon atoms and a polyhydroxy compound selected from the group consisting of polyethylene glycol, polypropylene glycol, polytetramethylene glycol, hydroxyl-group-containing polyesters, hydroxyl-group-containing polycarbonates, castor oil, castor oil derivatives, monoglycerides of naturally occuring fatty acids and mixtures thereof.

2. A hemodialysis membrane according to claim 1, wherein said hydroxy compound is a polyhydroxy compound.

3. A hemodialysis membrane according to claim 1, wherein the isocyanate prepolymer is a reaction product of a diisocyanate and an ethoxylated fatty alcohol with 6 to 30 carbon atoms.

4. A hemodialysis membrane according to claim 3, wherein a degree of ethoxylation of said isocyanate prepolymer is 5 to 400.

5. A hemodialysis membrane according to claim 1, wherein the isocyanate prepolymer is a reaction product of a diisocyanate and a polyhydroxy compound.

6. A hemodialysis membrane according to claim 5, wherein said polyhydroxy compound is at least one of a dihydroxy compound and a trihydroxy compound.

7. A hemodialysis membrane according to claim 1, wherein the isocyanate prepolymer is a reaction product of an intermediate product and at least one of hydrazine and an aliphatic diamine with a chain length of 2 to 30 carbon atoms, said intermediate product being formed by an initial reaction between a hydroxy compound and a polyfunctional isocyanate compound.

8. A hemodialysis membrane according to claim 1, wherein said regenerated cellulose is cellulose regenerated from a cuoxam solution.

9. A hemodialysis membrane according to claim 8, wherein said regenerated cellulose has an average molecular weight of 80,000 to 150,000.

* * * * *